Patented May 1, 1928.

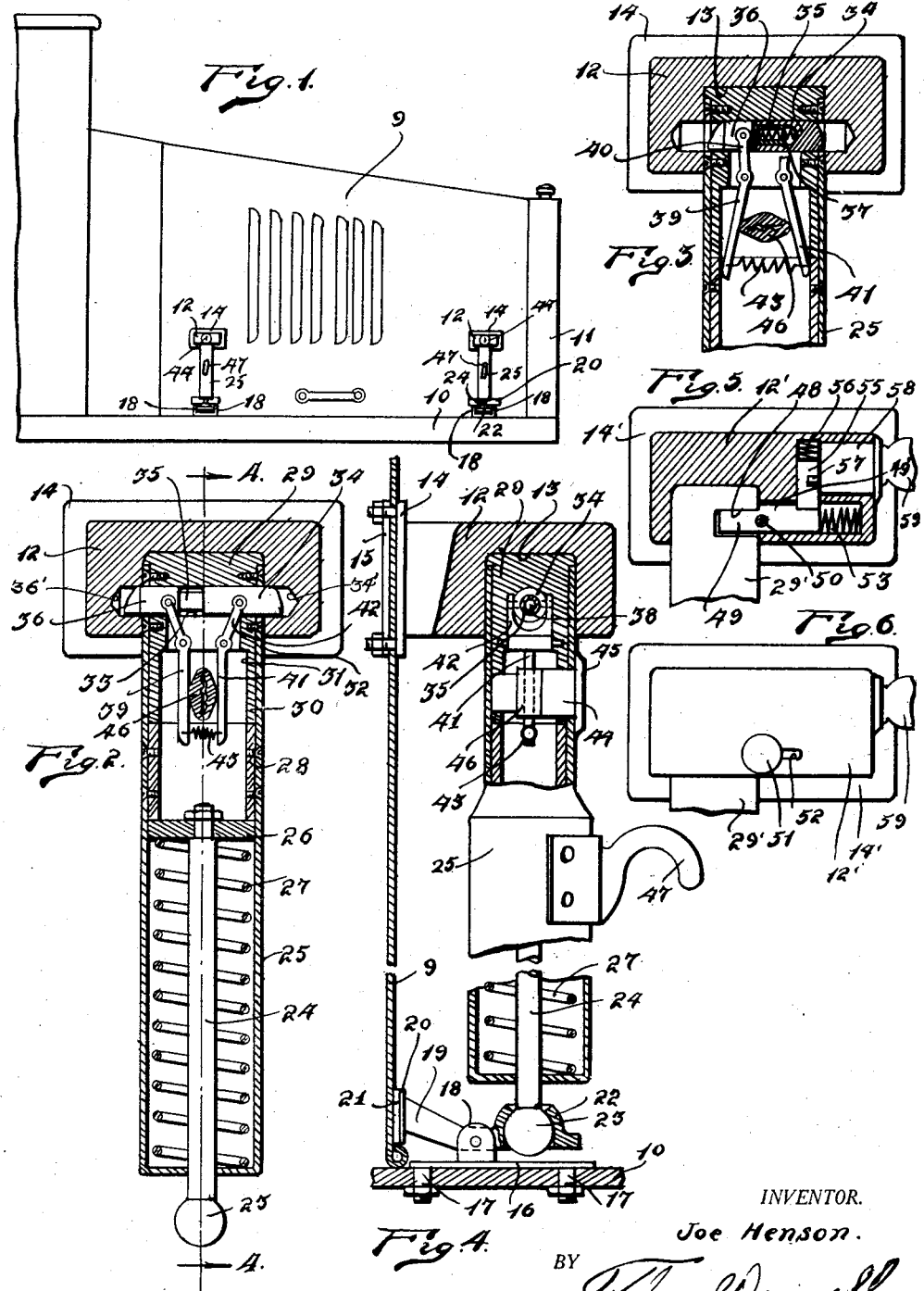

1,667,732

UNITED STATES PATENT OFFICE.

JOE HENSON, OF DETROIT, MICHIGAN.

HOOD FASTENER.

Application filed February 26, 1927. Serial No. 171,151.

My invention relates to a new and useful improvement in an engine hood fastener adapted for mounting on automobiles, and the like, which have a hood as a cover for the engine.

Many attachments are mounted on the engine and covered by the hood which are easily and quickly detached therefrom, and in many vehicles these attachments are expensive so that it becomes desirable to protect them from theft as much as possible.

To accomplish this is one of the objects of the invention.

Another object of the invention is the provision of an engine hood attachment which will be simple in structure, economical of manufacture and highly efficient in use.

Another object of the invention is the provision of an engine hood attachment whereby the engine hood may be locked in position automatically without the use of a key and rendered in fixed position until the mechanism is released by a key.

Another object of the invention is the provision in a device of this class of an antirattling member adapted for engaging the engine hood and retaining the same in position, and preventing rattling thereof.

Other objects will appear hereinafter.

The invention consists in the combination and arrangement of parts hereinafter described and claimed.

The invention will be best understood by a reference to the accompanying drawings which form a part of this specification, and in which, Fig. 1 is a side elevational view of an engine hood embodying the invention.

Fig. 2 is a central vertical sectional view of the invention.

Fig. 3 is a fragmentary sectional view of the invention showing the locking members in inoperative position.

Fig. 4 is a sectional view taken on line 4—4 of Fig. 2.

Fig. 5 is a fragmentary sectional view of a modified form of the invention.

Fig. 6 is a fragmentary side elevational view of the modified form of the invention.

The invention is illustrated as attached to an engine hood 9 which is swingably mounted relatively to the chassis 10 which supports the radiator 11, and rearwardly of which is mounted the engine for driving the vehicle. Mounted upon the engine hood by means of rivets or the like is a locking block 12 provided with a recess 13 formed therein and having a base 14 through which bolts or similar attaching means may be projected, a reinforcing plate 15 being positioned on the inner surface of the engine hood 9 for reinforcing the engine hood at the place of attachment of the block 12. Secured to the chassis 10 is a base 16, studs 17 projecting from one face thereof and extending through the chassis 10. Projecting upwardly from the plate 16 are lugs 18 between which is pivotally mounted the rocking arm 19 having the foot 20 at one end thereof, to which is attached a layer 21 of yieldable sound-deadening material, such as felt or the like, this foot being adapted to engage against the lower end of the radiator head and retain it in fixed relation to the chassis 10, and preventing rattling thereof. The other end of the arm 19 is provided with a cap 22 in which engages the ball 23 carried by the rod 24, this rod 24 extending into the cylinder or housing 25 in which is slidably positioned the piston 26 which is attached to the rod 24, a spring 27 being mounted in the housing 25 in embracing relation to the rod 24 and engaging at one end the bottom of the housing 25, and at the other end the piston 26.

Mounted in the housing 25 at its upper end is a reinforcing sleeve 30 cut away as at 31 and secured by screws 32 to the block 29 which is adapted to engage in the pocket or recess 13. Formed transversely in the block 29 is a passageway 33 in which is slidably mounted a plunger or locking pin 34 in alignment with, and adapted to engage in the pocket 34' formed in the block 12 upon projection beyond the periphery of the cylinder or housing 25. A reduced portion 35 of an aligned plunger or locking pin 36 is adapted to engage in a socket formed in the end of the pin 34, a spring 37 being mounted in this socket for normally retaining these plungers or locking pins 34 and 36 pressed outwardly beyond the periphery of the cylinder or housing 25. Formed in the block 12 in alignment with the opening 34' is a pocket or recess 36' in which the plunger or locking pin 36 is adapted to engage upon its outward projection, as shown in Fig. 2. Rockingly mounted interiorly of the reinforcing sleeve 28, adjacent the upper end thereof, is a lever 39 carrying the yoke 40 at its upper end, pivotally connected to the plunger or locking pin 36. A similar lever 41 is pivotally mounted, intermediate its ends, in the reinforcing sleeve 28, adjacent its upper end, and is provided at its upper end with a yoke 42 which is pivotally attached to the plunger or locking pin 34. A spring 43 serves normally to retain these levers 39 and 41 in the position shown in Fig. 2.

Mounted in the housing or cylinder 25 is a plate 45 from which projects inwardly a lock barrel 44 carrying at its inner end a cam 46 positioned between the levers 41 and 39, so that when the cam 46 is rocked on its axis, it will cause a withdrawal of the lower ends of the levers 41 and 39, and serve to retract the plungers or locking pins 34 and 36 within the marginal limits of the cylinder or housing 25, as shown in Fig. 3. The barrel 44 is provided with conventional locking tumblers so that a key is necessary for effecting a rotation of the cam 46. Fastened to the housing 25 is a gripping member 47.

In operation, after the device is attached to the chassis and the engine hood as described, when the engine hood is lowered into position, the housing or cylinder 25 may be rocked on the ball 23 as a pivot until the block 29 is brought into alignment with the recess or pocket 13, whereupon the operator, by raising upwardly on the gripping member 47, may, against the tension of the spring 27, move the block 29 into the pocket or recess 13, the ends of the plungers or locking pins being beveled to facilitate this movement. When these plungers or locking pins are brought into alignment with their respective pockets 34' and 36' a spring 43, cooperating with the spring 37, will serve to move the plungers or locking pins outwardly into their respective pockets, thus locking the hood relatively to the chassis. At the same time, on account of the compression of the spring 27, the arm 19 will be pressed downwardly at its foot 20 so as to engage the bead of the engine hood, and prevent the engine hood from rattling at its lower edge.

When the engine hood is thus locked in position a key is necessary for effecting a rotation of the cam 46 to retract the plungers or locking pins, whereupon a disengagement of the block 29 from the recess 13 will be facilitated on account of the compression of the spring 27.

In this manner there is provided a simple and inexpensive method of locking the engine hood in fixed position so that the desired protection will be effected.

In Fig. 5 and Fig. 6 I have shown a slightly modified form of the invention in which a locking plate 29' is adapted to engage in a recess formed in the block 12' which is provided with the base 14. Formed in one side of the locking plate 29' is a transversely extending slot 48 into which is adapted to project one end of a locking bolt 49, a spring 53 serving normally to force this bolt into the recess 48. A pin 50 is attached to the locking bolt 49 and projected through a slot 52 formed in the block 12 and provided with a head 51. Upon movement of the pin 50 in the slot 52, the locking bolt 49 may either be projected into or retracted from the recess 48. Mounted in the block 12' slidably is a locking bolt 55 pressed by the spring 56 to normally lie in engagement with the surface of the locking bolt 49 behind the shoulder 49' so as to prevent retraction of the locking bolt 49 from the recess 48. A lock barrel 58 rotatable by means of a key 59 is mounted in the block 12' and provided with a plunger 57 which is adapted to engage the bolt 55 and raise it to inoperative position, so as to prevent a retraction of the bolt 49.

This modified form is somewhat simpler in structure than the preferred form, although it does not afford as secure a locking and is not desirable on account of its cheapness of appearance on the more expensive cars.

While I have illustrated and described the preferred form of construction, I do not wish to limit myself to the precise details of structure shown, but desire to avail myself of such variations and modifications as come within the scope of the appended claims.

Having thus described my invention what I claim as new and desire to secure by Letters Patent is:

1. A hood fastener of the class described adapted for use with a hood carried by a chassis, comprising: a socket bearing member mounted on said hood, said socket bearing member having a pair of aligned recesses formed in opposite sides; a lock bearing member mounted on said chassis and adapted for engagement in said socket; plungers on said lock bearing member adapted for projecting outwardly into said recesses; and key operated means for withdrawing said plungers from said recesses.

2. A hood fastener of the class described adapted for use with a hood carried by a chassis, comprising: a socket bearing member mounted on said hood, said socket bearing member having a pair of aligned recesses formed in opposite sides; a lock bearing member mounted on said chassis and adapted for engagement in said socket; plungers slidably mounted on said lock bearing member and adapted for projecting outwardly into said recesses; resilient means for normally retaining said plungers in outwardly projected position; a pair of rockably mounted arms, each pivotally connected at one end to one of said plungers; and key operated means for rocking said arms to effect a retraction of said plungers out of said recesses.

In testimony whereof I have signed the foregoing specification.

JOE HENSON.